United States Patent Office 2,968,467
Patented Jan. 17, 1961

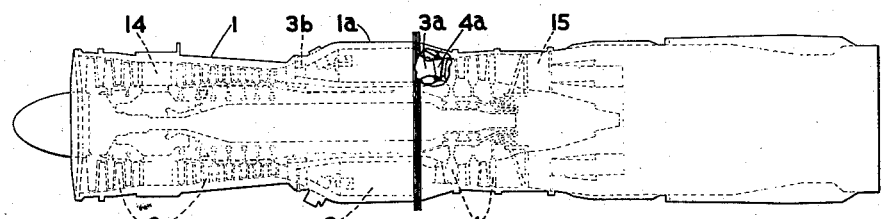
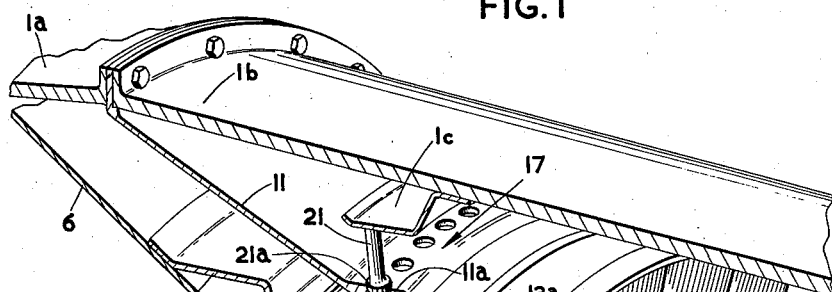
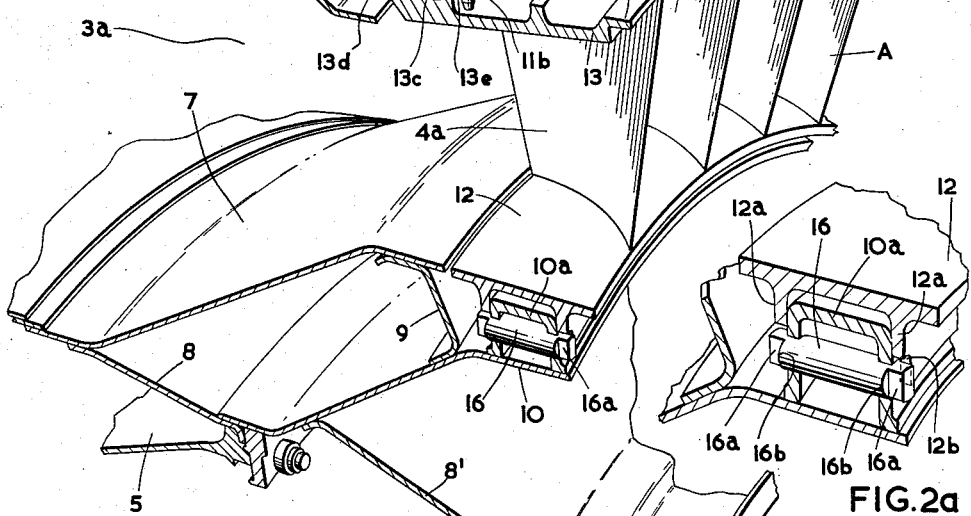
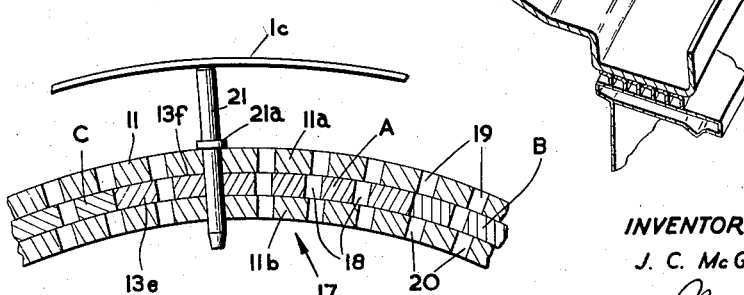
INVENTOR
J. C. McGREGOR
BY: Maybee & Legris
ATTORNEYS

2,968,467

CONNECTING MEANS, ESPECIALLY FOR SECURING ANNULAR STATOR ELEMENTS BETWEEN SUPPORTS WHOSE POSITIONS ARE FIXED

John Cameron McGregor, Oakville, Ontario, Canada, assignor to Orenda Engines Limited, Malton, Ontario, Canada, a corporation Filed Nov. 14, 1956, Ser. No. 622,227

4 Claims. (Cl. 253—78)

This invention relates to means for connecting together members whose relative positions cannot conveniently be predetermined with a high degree of accuracy, and it relates more particularly to means for connecting an annular stator element of a gas turbine engine between inner and outer supports whose relative fixed positions may be subject to some variation due to tolerances in the engine parts.

In gas turbine engines there are normally a number of stator elements bridging the annular space between outer stationary structure such as the outer casing of the engine and inner stationary structure supporting the engine shaft. Thus, when an engine element such as a turbine stator is being assembled between its inner and outer supports some misalignment may be encountered due to the fact that the inner and outer supports may be fixed in their relative positions by engine parts other than the turbine stator, and those parts of course are made with tolerances which may accumulate to make the assembly of the turbine stator difficult. Normally the greatest difficulty arises in accommodating errors in the relative angular (circumferential) relationships of the inner and outer supports, there being less difficulty in arranging the engine parts with accuracy in the axial and radial directions, or in accommodating errors in these directions.

According to the present invention, two members that are to be connected together, such as a segment of a turbine stator and a support for the segment, are each provided with a plurality of connecting or locking formations (portions having rows of holes in the preferred embodiment) which cooperate vernier-fashion in the direction in which difficulty of alignment is expected so that at least one of the locking means of each will be so located with respect to a locking means of the other that the two may be connected together.

The nature of the invention will be understood from the following description of a preferred embodiment, illustrated in the accompanying drawings, applied to the mounting of a segmented turbine stator ring in a gas turbine engine. In the drawings:

Fig. 1 is a side elevation, partly broken away, of a gas turbine engine;

Fig. 2 is a perspective view of a fragment of the engine, showing how the segments of the stator ring are mounted;

Fig. 2A is a somewhat enlarged view of part of the structure shown in Fig. 2; and Fig. 3 is a fragmentary sectional view on a radial plane through the cooperating connecting portions of segments of the stator ring and the outer support for the segments.

The gas turbine engine of Fig. 1 has an outer casing 1 housing axial flow compressors 2, an annular combustion chamber 3, and turbines 4. The structure of the first stator ring 4a of the turbines and the structure of the outlet portion 3a of the annular combustion chamber are shown in greater detail in Fig. 2.

The annular combustion chamber 3 is bounded on the outside by a portion 1a of the casing 1 and on the inside by an annular wall 5. The combustion chamber includes an annular flame tube having an outer wall 6 and an inner wall 7. The walls 5 and 7, baffles 8 and 8', and a brace 9 constitute part of the inner stationary structure of the engine to which is secured an inner support 10 for the stator ring 4a. Similarly the portion 1a of the outer casing, and the following portion 1b, constitute part of the outer stationary structure of the engine to which is secured an outer support 11 for the stator ring 4a. The ring 4a is conveniently made up of a number of segments A, B, C etc. (portions of which are shown in Fig. 3), perhaps twelve in number, arranged end to end around the engine, each segment having an inner platform 12 and an outer platform 13 for connection, respectively, to the inner and outer stationary engine structures.

In the particular engine illustrated, the relative positions of the inner support 10 and the outer support 11 for the ring 4a are substantially rigidly fixed, particularly in the circumferential direction, by a connection at the combustion chamber intake 3b. As will be described presently, it is convenient to employ pins 16 to fix the segments of the ring 4a in the circumferential direction relative to the inner support 10, but once this is done rotational adjustment of the ring relative to the outer support 11 is prevented, so that should the ring and the outer support be provided with conventional, prearranged, fixed points of connection these points may not coincide if the supports 10 and 11 are not located relative to each other with a high degree of accuracy. Accordingly the vernier-like construction generally indicated by reference numeral 17 (Figs. 2 and 3) is provided according to the present invention. The connections for a typical segment A, by means of the pins 16 for the inner support, and by means of construction 17 for the outer support, will now be described in detail.

The inner support 10 has secured to its outer surface a part 10a in the shape of an inverted channel, and the pins 16 fit snugly through holes in the walls of the channel with their axes parallel to the axis of the engine. The ends of the pins, projecting outwardly of the channel, are flattened at 16a, providing shoulders 16b (Fig. 2A) on the pins. The inner platform 12 has parallel inner flanges 12a that fit over the channel 10a to position the segment A axially of the engine, and the flanges 12a have radially slotted portions 12b fitting snugly over the flattened ends 16a of the pins but permitting radial adjustment of the segment to facilitate its outer connection at 17. (The slotted portions have the further and even more important purpose of allowing freedom for thermal expansion of the blades of stator ring 4a since these blades may reach considerably higher temperatures than their supporting structures.) The shoulders 16b of the pins abut against the flanges 12a and prevent the pins from being dislodged once the ring 4a is in place.

The outer platform 13 has a rear lip 13a for cooperation with a following shroud ring (not shown), an outer reinforcing rib 13b, an outer flange 13c hereinafter described, and a forward lip 13d that slips under an exterior skin 6a of the flame tube outer wall 6. The flange 13c has a rearwardly extending tongue 13e that fits between the legs 11a 11b of a U-shaped terminal portion of the outer support 11. The tongue 13e has a row of identical holes 18 (Fig. 3) running in the circumferential direction, the axes of the holes being radial of the engine. The legs 11a and 11b also have circumferential rows of identical holes 19 and 20 respectively, each hole 19 in leg 11a being coaxial with a corresponding hole 20 in leg 11b. The tongue 13e fits between the legs 11a and 11b so as to bring the axes of the holes 18 into a common radial plane with the axes of the holes 19 and 20.

The holes 18 are spaced apart at equal angular intervals in their row, as are the holes 19, but the intervals in the row of holes 18 are of slightly different magnitude than the intervals in the row of holes 19 so that it is impossible for each hole 18 to be aligned with a hole 19. However the holes are spaced so as to provide, within the margin of possible difference of circumferential aspect between the inner and outer supports 10 and 11, one set of very closely aligned holes 18, 19, 20 and through that aligned set a rigid connecting pin 21 is pressed to secure the element A to the support 11. The outer casing portion 1b is of course removed during assembly of the segments of ring 4a in the engine, but when the portion 1b is secured in position as shown in Fig. 2, a somewhat flexible lip 1c within it presses radially inwardly on the pins 21 to hold them in place, the pins having shoulders 21a that abut against the outer surface of the leg 11a.

The tongue 13e of the flange 13c, having the holes 18, thus provides a type of female locking formation while the legs 11a and 11b of the U-shaped portion of the outer support 11 having the holes 19 and 20 provide a type of female locking formation. The pin 21, which is pressed through one set of closely aligned holes 18, 19, and 20 so that it engages the circumferential edges of the closely aligned holes, constitutes a male rigid connecting element.

The segment A illustrated in Fig. 3 has five holes 18 in a row, and the engine is designed so that the hole midway along the row should theoretically align with corresponding holes 19 and 20 of the legs 11a and 11b. However the tolerances of the engine parts may, for example, be such that, on an arc measured along the outer surface 13f of the tongue 13e, the radial axis of the hole midway along the row of holes 18 might, with the engine assembled, be ten-thousandths of an inch to one side or the other of its theoretical location, and the radial axis of the hole 19 with which the hole 18 should theoretically align might also be ten-thousandths of an inch to one side or the other of its theoretical location, so that twenty-thousandths of an inch is the maximum expected misalignment. Defining the interval or pitch of the holes 18 as the distance measured along the above mentioned arc between the axes of successive holes 18, the pitch of successive holes 19 measured along the same arc should be greater (or less) by twice the quotient of the maximum expected misalignment divided by the number of holes 18 per segment (five), or eight-thousandths of an inch. The greatest possible misalignment between the best aligned holes 18 and 19 would then be only four-thousandths of an inch, as compared to twenty-thousandths of an inch if only a single hole 18 had been provided to register with a single pair of holes 19 and 20. A misalignment of ±twenty-thousandths would require a pin 21 having too sloppy a fit, whereas a maximum misalignment of ±four-thousandths permits a tight pin connection of the segment A to the support 11. The maximum misalignment falls in proportion to the number of holes 18 per segment, and it will be seen that the rows of holes 18 and 19, of different pitches, have a vernier-like effect permitting a tight connection despite appreciable variations in circumferential aspect of the supports 10 and 11. Generalizing, with a maximum expected misalignment of ±x, and with n holes per segment, the maximum misalignment is reduced to $$\pm \frac{x}{n}$$

with a difference in pitch of $2x/n$.

Each of the other elements B, C etc. of the ring 4a is of course secured to the support 11 by a single pin 21 in the same way as the element A. If desired, the circumferential rows of holes 19 and 20 may be continuous right around the periphery of the engine, in which case the interval between a hole 18 of element A and any similar hole 18 of another element (measured along a circumferential arc, or by the angle subtended by such an arc) should be a multiple of the interval between adjacent holes 18 of element A.

With the construction illustrated in the drawings, it will be seen that the axial positions of the elements A, B, C etc. are fixed by the channel 10a, the cooperating flanges 12a, the U-shaped portion 11a, 11b of support 11 and the cooperating tongue 13e; the radial positions are determined by the U-shaped portion 11a, 11b and tongue 13e; and the circumferential positions are determined by the pins 16; the vernier-like construction 17 accommodating errors in the fixed circumferential positions of the supports 10 and 11, and thus of the ring 4a relative to the outer support 11.

The construction 17 eliminates the need for controlling to a high degree of accuracy the angular relationship between the holes in the support 11 (for the pins 21) and those in channel 10a (for the pins 16). This relationship depends on a number of engine parts which would otherwise have to be manufactured to an undesirably high degree of precision.

It is to be understood that the form of the invention herewith shown and described is to be taken as a preferred example of the same, and that various changes in the shape, size and arrangement of the parts may be resorted to without departing from the spirit of the invention or the scope of the subjoined claims.

What I claim as my invention is:

1. For a gas turbine engine, the combination of an annular stator element made up of bladed segments, an annular inner support for the segments, an annular outer support for the segments, means fixing the relative positions of the inner and outer supports, and means connecting the segments to the inner and outer supports comprising segment locating means of the annular inner support fixing the positions of the segments in their circumferential direction on the inner support, the outer support and the segments each having a circumferential row of holes, all the holes having axes lying in a common radial plane, the holes of the outer support being spaced apart at equal angular intervals in the row, the holes of each segment being spaced apart at equal angular intervals of slightly different magnitude than the first mentioned intervals whereby all of said holes cannot be simultaneously aligned and whereby at least one of the holes of each segment is substantially in alignment with one of the holes of the outer support, and radial pins in only the substantially aligned holes and connecting the segments with the outer support.

2. The combination claimed in claim 1, in which the means fixing the relative positions of the inner and outer supports include an outer casing to which the outer support is secured, the casing having means holding the radial pins in the aligned holes.

3. The combination claimed in claim 1, in which the outer support has a U-shaped portion, with the circumferential row of holes of the outer support located in one leg of the U and with another circumferential row of holes in the other leg of the U, each hole in one leg being coaxial with a hole in the other leg, each segment having a flange fitting between the legs of the U, the holes of the segment being located in the flange, the pins in the aligned holes extending through the flange and through both legs of the U, said U-shaped portion and flanges fixing the radial positions of the segments.

4. The combination claimed in claim 3, in which the segment locating means of the annular inner support include pins parallel to the axis of the annular stator element, the segments having radial slots through which the pins extend to permit radial movement of the segments relative to the inner support.

References Cited in the file of this patent

UNITED STATES PATENTS

| | | |
|---|---|---|
| 276,292 | Seymour | Apr. 24, 1883 |
| 2,488,867 | Judson | Nov. 22, 1949 |
| 2,640,319 | Wislicenus | June 2, 1953 |
| 2,665,614 | Reip | Jan. 12, 1954 |
| 2,702,665 | Ledwith | Feb. 22, 1955 |
| 2,722,373 | Ledwith | Nov. 1, 1955 |
| 2,812,158 | Shinn | Nov. 5, 1957 |